United States Patent [19]

Dunigan

[11] 3,928,761

[45] Dec. 23, 1975

[54] PHOTOELECTRIC APPARATUS EMPLOYING PHASE LOCKED LOOP CIRCUITS

[76] Inventor: Francis P. Dunigan, 143 Lovell Road, Holden, Mass. 01520

[22] Filed: Apr. 15, 1974

[21] Appl. No.: 460,748

[52] U.S. Cl. .................... 250/205; 315/151; 323/31

[51] Int. Cl.[2] .............................................. G01J 1/32

[58] Field of Search ....... 250/205; 331/66; 315/151, 315/158; 323/21

[56] References Cited

UNITED STATES PATENTS

| | | | |
|---|---|---|---|
| 2,878,395 | 3/1959 | Mindheim | 250/205 |
| 3,214,593 | 10/1965 | Killpatrick | 250/205 X |
| 3,215,843 | 11/1965 | Neil | 250/205 |
| 3,427,458 | 2/1969 | Parfomak et al. | 250/205 |
| 3,473,084 | 10/1969 | Dodge | 315/151 |

*Primary Examiner*—Walter Stolwein
*Attorney, Agent, or Firm*—Charles R. Fay

[57] ABSTRACT

Photoelectric apparatus comprising a light or other signal emitting element, the output of which can be modulated by the application of electrical impulses from an oscillator, the light e.g., falling on a photosensitive device provided with means for creating an electric wave form supplying a signal to a phase/frequency detector, thence through a filter to an output, wherein the oscillator supplies an electric wave signal to the phase/frequency detector, which supplies a signal to the output only upon receiving a wave form from the photosensitive device and the oscillator having substantially the same frequency. The output can be used to control electromagnetic devices or the like or to provide a signal to other elements as may be found desirable or convenient.

9 Claims, 1 Drawing Figure

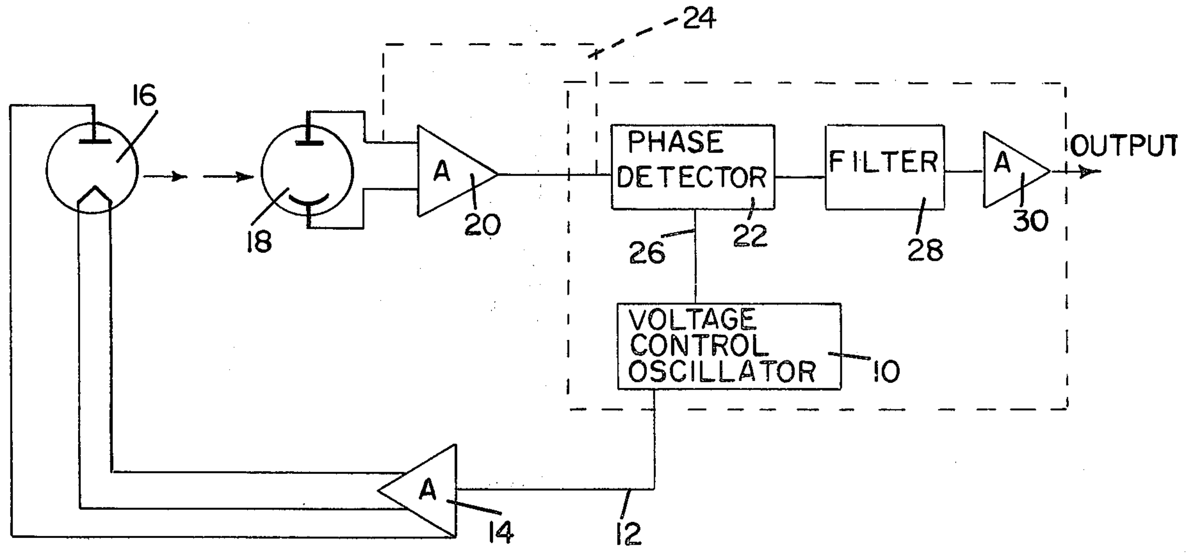
24
16
PHASE
DETECTOR
FILTER
OUTPUT
A
A
A
18
20
22
26
28
30
VOLTAGE
CONTROL
OSCILLATOR
10
14
12

PHOTOELECTRIC APPARATUS EMPLOYING PHASE LOCKED LOOP CIRCUITS

BACKGROUND OF THE INVENTION

Photoelectric systems are known which employ one frequency determining circuit to control pulses applied to the signal emitting element, and a second frequency determining element to control the acceptance frequency of the electrical circuitry. Such systems are subject to a mismatch between the two frequencies and resulting impairment of operation, particularly with aging of components or initial mismatch.

Furthermore, prior art systems usually employ a signal integrating element in the electrical circuitry and such elements contribute materially to the susceptibility of such apparatus to false operation which may be caused by transient or ambient electrical pulses reaching the integrating circuitry. In addition, prior art systems usually employ frequency selective circuits which will accept signals having a considerable difference in frequency from the design center frequency. Thus such electrical circuits cannot differentiate between two pulse light sources having a more or less common path unless the frequency of each light source is considerably different.

SUMMARY OF THE INVENTION

It is the general object of the present invention to provide improved photoelectric apparatus which emits pulses of light at a predetermined frequency and which includes frequency selective circuitry for receiving the signals from a photosensitive element.

Another object of the invention relates to the provision of a common frequency determining circuit control both as to the light frequency and the acceptance frequency of the electrical circuit. Therefore aging of the circuit components and resulting change in the frequency does not result in a difference between the light source frequency and the acceptance frequency of the electrical circuitry. Still another object of the present invention resides in the provision of an acceptance frequency band which may be designed to limit the acceptable signal frequencies over a range from plus or minus fourteen percent to as small a value as desired e.g., less than one percent and also to reduce the influence of transient signals as for instance from magnetic coils, relays, motors, etc., to an absolute minimum.

A voltage controlled oscillator delivers a wave form to a phase detector which also receives a wave form from a photosensitive device energized by an output receiving impulses from the same voltage control oscillator, and compares the wave forms, passing a signal only if the wave forms from the photosensitive device are of a frequency within the limits of the designed frequency acceptance band.

BRIEF DESCRIPTION OF THE DRAWING

The FIGURE is a block diagram showing the electrical system serving to energize the light producing element and to receive and analyze the photosensitive detector output.

PREFERRED EMBODIMENT OF THE INVENTION

A voltage controlled oscillator 10 may be made to provide a signal, e.g., a square or other wave output signal at 12, serving to turn on and off an amplifier 14. The amplifier provides electrical impulses having approximately a fifty percent duty cycle to a light emitting element 16 which may be a light emitting diode or other electrical device whose light output is determined by the electrical impulses supplied to the amplifier 14, but it is pointed out that element 16 may be such as to emit other signals such as sound signals or the like. The reference to "light" also includes invisible radiation, electromagnetic signals, etc., and any transducer or transducers that may be relevant to the operation of the circuit.

The light output of the light emitting diode 16 impinges either by direct means or by well known indirect means, reflections, etc., on a photosensitive element 18. The output signal of the photosensitive element 18 is amplified by the amplifier 20, and its output is applied to the phase detector 22.

The phase detector 22 compares the signal from amplifier 20 with a signal obtained from the voltage control oscillator 10, as at 26.

The function of the phase detector 22 is to compare the frequencies of the two electrical signals applied to it. This phase detector is a commercial device old and well known in the art. However, maximum output is obtained when these frequencies are identical and have the proper phase relationship. Since the frequency of both applied signals is the same being both derived from a common oscillator, this requirement is therefore met.

The amplifier 14 includes phase shifting circuitry to insure that the ideal phase relationship does exist between signals from the amplifier 20 and from the signal at 26.

The output signal from phase detector 22 is applied to a filter 28 whose output is applied to an amplifier 30. The output of this amplifier is used to energize electromagnetic devices or the like, or to provide a signal to other elements as may be found desirable or convenient.

The output of the amplifier 30 is also applied to the voltage control oscillator 10 which serves to compensate for any small phase difference in the signals which are applied to the phase detector 22 to maximize its output.

Proper choice of filter circuitry at 28 will limit the ability of the voltage control oscillator 10 to synchronize with extraneous signals received by the photosensitive element, or from stray noise signals, and this restriction prevents an output signal from the amplifier 30 from being produced by any but the desired frequencies within the preset limits.

It is to be emphasized that all of the individual devices as described are commercial products and individually all are well known by those skilled in the art, and do not need further description. An amplifier with phase shifting circuitry suitable for use at 14 in this case is described in the "linear integrated circuit" catalogue published by the National Semiconductor Corporation, Santa Clara, Calif., 95051, copyright 1973. Reference is made to this catalogue on pages 5, 51 to "type LM 567 - LM 567C decoders."

The circuits described above may also include means to interrupt or partially interrupt the signal from the signal emitter 16, thereby causing changes in the amplifier output, e.g., de-energization of a magnetic device, etc.

An adjustable threshold can be utilized so that only a partial reduction of the light energy received at the photosensitive element will cause a change in the amplifier output. A fixed or variable threshold may be provided which also includes means for controlling the amount of light emitted by the light emitting device, such means being e.g., by mechanical obstruction, shutter, optical elements, liquid crystals, or by control of the magnitude of the electrical pulses supplied to the light emitting element.

The light emitting element and the photosensitive element can be replaced by other types of transducers e.g., sound vibration, etc., and the apparatus can be used to perform various useful functions which are ordinarily performed by similar circuits e.g., code readers, level controls, etc.

In this invention the phase-frequency detector and filter provide a recognition and operation over an accepted frequency range which can be limited to plus or minus one percent or less of the center frequency to as much as plus or minus fourteen percent or more of the center frequency.

I claim:

1. Phase locked loop in signal emitting circuit comprising an oscillator, said oscillator being connected to an optical signal emitting device, a signal receiving device, means for translating the signal into an electric signal, a connection from said signal translating means to a phase detector, and a connection from the oscillator to the phase detector, said phase detector providing an output signal only upon receiving an electric wave form emanating from the signal receiving device and from the oscillator which wave forms are substantially the same.

2. The circuit of claim 1 wherein the signal emitted comprises light.

3. The circuit of claim 1 wherein the signal emitted comprises invisible radiation.

4. The circuit of claim 2 wherein the receiving device of the light is a photoelectric cell.

5. A circuit comprising a voltage controlled oscillator, two output signal means leading therefrom one output signal means leading to a phase detector and the other to a light emitting element, a photosensitive element receiving signals from the light emitting element, the photosensitive element being connected to the phase detector for comparison of the electrical waves formed, and a filter connected to the phase detector and to an output signaling device, the phase detector operating only upon substantial similarity of the electrical wave forms received by the phase detector from both output signals.

6. The circuit of claim 5 wherein the light emitting element is a diode.

7. The circuit of claim 1 wherein the phase detector includes means for recognition and operation over an accepted frequency range limited to less than plus or minus 1 percent of the center frequency and as much as plus or minus fourteen percent of the center frequency.

8. The circuit of claim 1 including means controlling the amount of light emitted by the light emitting source.

9. The circuit of claim 1 including means to interrupt the passage of the optical signal from the optical emitting element causing a change in the output of the amplifier and de-energization of a subsequent element.

* * * * *